United States Patent
Pregnolato et al.

(10) Patent No.: US 8,978,499 B2
(45) Date of Patent: Mar. 17, 2015

(54) GEAR CHANGE DEVICE FOR A MOTOR VEHICLE

(75) Inventors: Gianluigi Pregnolato, Orbassano (IT); Andrea Piazza, Orbassano (IT)

(73) Assignee: C.R.F. Società Consortile per Azioni, Orbassano (Torino) (IT)

( * ) Notice: Subject to any disclaimer, the term of this patent is extended or adjusted under 35 U.S.C. 154(b) by 753 days.

(21) Appl. No.: 13/112,283

(22) Filed: May 20, 2011

(65) Prior Publication Data
US 2012/0132031 A1    May 31, 2012

(30) Foreign Application Priority Data
Nov. 29, 2010  (EP) ..................................... 10192850

(51) Int. Cl.
*F16H 37/06*    (2006.01)
*F16H 3/00*    (2006.01)
(Continued)

(52) U.S. Cl.
CPC .............. *F16H 3/006* (2013.01); *F16H 57/021* (2013.01); *F16H 63/48* (2013.01); *F16H 3/093* (2013.01);
(Continued)

(58) Field of Classification Search
CPC ......... F16H 3/006; F16H 3/093; F16H 3/089; F16H 3/097; F16H 2003/0931; F16H 2003/0822; F16H 2003/0935; F16H 63/48; F16H 63/18; F16H 2200/0056; F16H 2200/0052; F16H 2200/0047; F16H 2200/006; F16H 61/688; F16H 61/32; F16H 61/12; F16H 61/0403; F16H 61/30; F16H 61/702
USPC .................... 74/325, 329, 330, 331, 335, 340
See application file for complete search history.

(56) References Cited

U.S. PATENT DOCUMENTS 4,481,837 A * 11/1984 Stevens ........................... 74/342
5,623,851 A *  4/1997 Ooyama et al. .................. 74/333
(Continued)

FOREIGN PATENT DOCUMENTS

CN         101571179 A      11/2009
DE    102004056936 A1       6/2006
(Continued)

OTHER PUBLICATIONS

European Search Report, dated Mar. 17, 2011, for corresponding European application No. 10192850.5-1254, completed Mar. 9, 2011.
(Continued)

*Primary Examiner* — William Kelleher
*Assistant Examiner* — Terence Boes
(74) *Attorney, Agent, or Firm* — Heslin Rothenberg Farley & Mesiti P.C.; Victor A. Cardona, Esq.

(57) ABSTRACT

A gear change device includes a first and a second primary shaft, selectively connectable to the driving shaft of a motor vehicle, and first second secondary shafts, The device includes pairs of gear wheels, corresponding to forward gear ratios and to at least one reverse gear ratio. The reverse gear ratio is defined by a first reverse gear wheel mounted freely rotatable on the first secondary shaft and connectable in rotation with the latter by one of the selector devices. A parking gear wheel is rigidly mounted on the first secondary shaft The parking gear wheel is mounted adjacent to a roller bearing which rotatably supports the first secondary shaft within the casing and which is axially interposed between the parking gear wheel and the first reverse gear wheel.

1 Claim, 3 Drawing Sheets

(51) Int. Cl.
*F16H 57/021* (2012.01)
*F16H 63/48* (2006.01)
*F16H 3/093* (2006.01)

(52) U.S. Cl.
CPC . *F16H 2003/0931* (2013.01); *F16H 2200/0047* (2013.01); *F16H 2200/0052* (2013.01); *F16H 2200/0056* (2013.01)
USPC .............................................. 74/330; 74/331

(56) References Cited

U.S. PATENT DOCUMENTS

| | | | |
|---|---|---|---|
| 6,585,619 B2 * | 7/2003 | Henzler | 475/214 |
| 6,634,247 B2 * | 10/2003 | Pels et al. | 74/329 |
| 6,644,440 B2 * | 11/2003 | Kageyama et al. | 184/11.2 |
| 6,868,952 B2 * | 3/2005 | Burger | 192/219.4 |
| 7,044,013 B2 * | 5/2006 | Ahrens | 74/331 |
| 7,083,540 B2 | 8/2006 | Janson et al. | |
| 7,340,973 B2 * | 3/2008 | Hiraiwa | 74/330 |
| 7,383,749 B2 * | 6/2008 | Schafer et al. | 74/340 |
| 7,690,278 B2 * | 4/2010 | Burgardt et al. | 74/331 |
| 8,534,148 B2 * | 9/2013 | Garabello et al. | 74/330 |
| 2007/0289399 A1 * | 12/2007 | Tanba et al. | 74/330 |
| 2009/0266191 A1 * | 10/2009 | Remmler | 74/331 |
| 2010/0139454 A1 * | 6/2010 | Burgardt et al. | 74/665 F |
| 2010/0288064 A1 | 11/2010 | Singh et al. | |
| 2013/0145897 A1 * | 6/2013 | Pregnolato et al. | 74/664 |

FOREIGN PATENT DOCUMENTS

| | | |
|---|---|---|
| GB | 2412147 B | 3/2008 |
| GB | 2458790 A | 10/2009 |
| JP | 2007321821 A | 12/2007 |

OTHER PUBLICATIONS

2nd Office Action in corresponding Chinese Patent Application No. 201110181551.9, dated Mar. 12, 2014.

* cited by examiner

GEAR CHANGE DEVICE FOR A MOTOR VEHICLE

CROSS REFERENCE TO RELATED APPLICATIONS

This application claims priority from European patent application No. 10192850.5, filed on Nov. 29, 2010, the entire disclosure of which is incorporated herein by reference.

BACKGROUND OF THE INVENTION

The present invention refers to gear change devices for motor vehicles, of the type comprising:
- a first and a second primary shaft coaxial with respect to each other, selectively connectable to the driving shaft of the motor vehicle by means of a double clutch engagement device,
- a first and a second secondary shaft, whose axes are parallel and spaced from the common axis of said primary shafts, and having respective output gear wheels intended to mesh with the gear wheel of a differential,
- a plurality of pairs of gear wheels, corresponding to a plurality of forward gear ratios and to at least one reverse gear ratio, wherein the gear wheels of each pair are one rigidly connected in rotation with one of the primary shafts or with one of the secondary shafts while the other is freely rotatable on one of the secondary shafts or on one of the primary shafts respectively,
- a plurality of gear selector devices for rotatably coupling each of said freely rotatable gear wheels with the shaft on which it is mounted, wherein the reverse gear ratio is defined by:
- a first reverse gear wheel mounted freely rotatable on the first secondary shaft and connectable in rotation with the latter by means of one of said selector devices, with the aim of selecting the reverse gear,
- a second reverse gear wheel, which serves as an idler gear wheel for inverting the motion, which meshes with said first reverse gear wheel and which is mounted freely rotatable on the second secondary shaft, said second reverse gear wheel being permanently connected in rotation with a forward gear wheel which is mounted freely rotatable on the abovementioned second secondary shaft and meshes with a gear wheel rotatably rigidly connected on one of said primary shafts, wherein a parking gear wheel is operatively connected to said first secondary shaft cooperating with a lock device for locking the gear change device in the parking condition.

A gear change device of the above indicated type is described in DE 10 2004 056 936 and in the corresponding U.S. Pat. No. 7,690,278 B2 and WO 2006/0563252.

SUMMARY OF THE INVENTION

The object of the present invention is that of providing a gear change device of the above indicated type which is simple and functional from a construction point of view. In particular an object of the present invention is that of providing a gear change device of the above indicated type which can be designed with greater flexibility of choice for the positioning of the various components thereof, according to the available spaces.

With the aim of attaining such object, the invention provides a gear change device having all the above indicated features and further characterized in that the abovementioned parking gear wheel is mounted adjacent to a roller bearing which rotatably supports said first secondary shaft and which is interposed axially between said parking gear wheel and said first reverse gear wheel.

BRIEF DESCRIPTION OF THE DRAWINGS

The present invention shall now be described with reference to the attached drawings, purely provided by way of example, wherein.

DETAILED DESCRIPTION OF THE INVENTION

Figure 1:
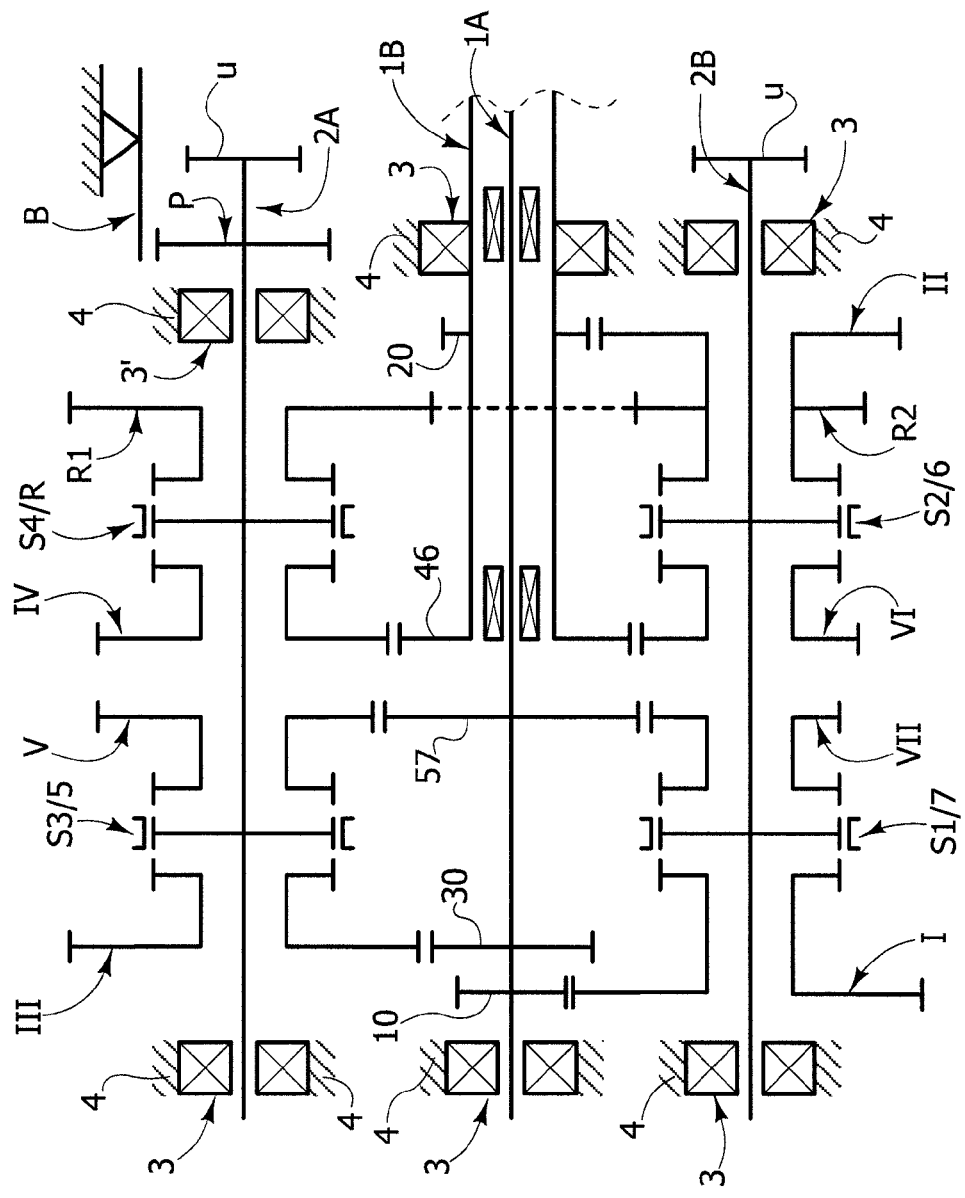
FIG. 1 is a diagram of a first embodiment of the gear change device according to the invention.

With reference to FIG. 1, a gear change device for a motor vehicle, comprising a first primary shaft 1A and a second primary shaft 1B coaxial with respect to each other, whose right ends (with reference to the figures) are selectively connectable to the driving shaft of a motor vehicle by means of a double clutch engagement device of any known type (not illustrated) is indicated in its entirety with number 1.

A first and a second secondary shaft, whose axes are parallel and spaced from the common axis of the two primary shafts 1A, 1B are indicated in their entirety with references 2A, 2B.

For better clarity, the figures show the shafts 1A, 1B, 2A, 2B as if the three axes thereof were arranged in the same plane, while such axes actually are not coplanar, but they are arranged to form a triangle.

All the abovementioned shafts are rotatably supported by means of roller bearings 3 within the casing 4 of the gearbox.

The two secondary shafts 2A, 2B have—at the right ends thereof (with reference to the figures)—output gear wheels u intended to mesh both, in a per se known manner, with a gear wheel of a differential (not illustrated).

The illustrated gear change device has a plurality of pairs of gear wheels, corresponding to the plurality of forward gear ratios and to one reverse gear ratio, wherein the gear wheels of each pair are one rigidly connected in rotation with one of the primary shafts or with one of the secondary shafts, while the other is freely rotatable respectively, in both cases, on one of the secondary shafts or on one of the primary shafts. Furthermore, still according to the conventional art, the device comprises a plurality of gear selector devices suitable for rotatably coupling each of said freely rotatable gear wheels with the shaft on which it is mounted.

In the specific case illustrated in FIG. 1, references I, II, III, IV, V, VI, VII, R1 respectively indicate gear wheels freely rotatably mounted on the first or on the second secondary shaft 2A, 2B and couplable with the respective secondary shaft for respectively selecting the first, second, third, fourth, fifth, sixth, seventh gears and the reverse gear.

The gear wheel I meshes with a gear wheel 10 rigidly and permanently connected in rotation with the first primary shaft 1A, i.e. on the inner primary shaft, on one end portion thereof extending beyond the end of the second primary shaft 1B.

The gear wheel II of the second gear meshes with a gear wheel 20 rigidly connected to the primary shaft 1B.

The gear wheel III of the third gear meshes with a gear wheel 30 rigidly connected to the primary shaft 1A.

The gear wheel IV of the fourth gear and the gear wheel VI of the sixth gear both mesh with the same gear wheel 46 rigidly connected to the primary shaft 1B.

The gear wheel V of the fifth gear and the gear wheel VII of the seventh gear both mesh with the same gear wheel 57 rigidly connected to the primary shaft 1A.

The selector devices for rotatably coupling each of the gear wheels I, II, III, IV, V, VI, VII, R1 are indicated with references S1/7, S2/6, S3/5, S4/R, each of such selector devices being actuatable in opposite directions for selecting different gears (the digits of the number that follows the reference S indicate the gears thus selectable).

The second forward gear is defined by a pair of gear wheels 20, II, the first permanently connected in rotation with the outermost primary shaft 1B and the other mounted freely rotatable on the second secondary shaft 2B and rotatably couplable therewith through an engagement device schematically illustrated in the drawing and indicated with reference S2/6 (to indicate that such device selects the second gear in one direction and the sixth gear in the other direction).

The reverse gear ratio is defined by the first reverse gear wheel R1 which is mounted freely rotatable on the first secondary shaft 2A and it is rotatably couplable therewith through the selector device S4/R and by a second reverse gear wheel R2, which serves as an idler gear wheel for inverting the motion and which meshes with the first gear wheel R1 (such meshing, diagrammatically shown in the figure by a dashed line, being possible due to that the two axes of the secondary shafts and the common axis of the primary shafts are not contained in the same plane). The second reverse gear wheel R2 is permanently connected in rotation with the gear wheel II of the second gear and it is mounted freely rotatable connected on the second secondary shaft 2B.

With the arrangement described above, the engagement of the reverse gear is obtained by activating the selector device S4/R and leaving the selector device S2/6 disabled, so as to leave the second reverse gear wheel R2 freely rotatable on the second secondary shaft 2B. In such situation, the motion coming from the outermost primary shaft 1B is transferred to the gear wheel II and therefrom to the gear wheel R2, to the gear wheel R1 and to the first secondary shaft 2A.

Figure 2:
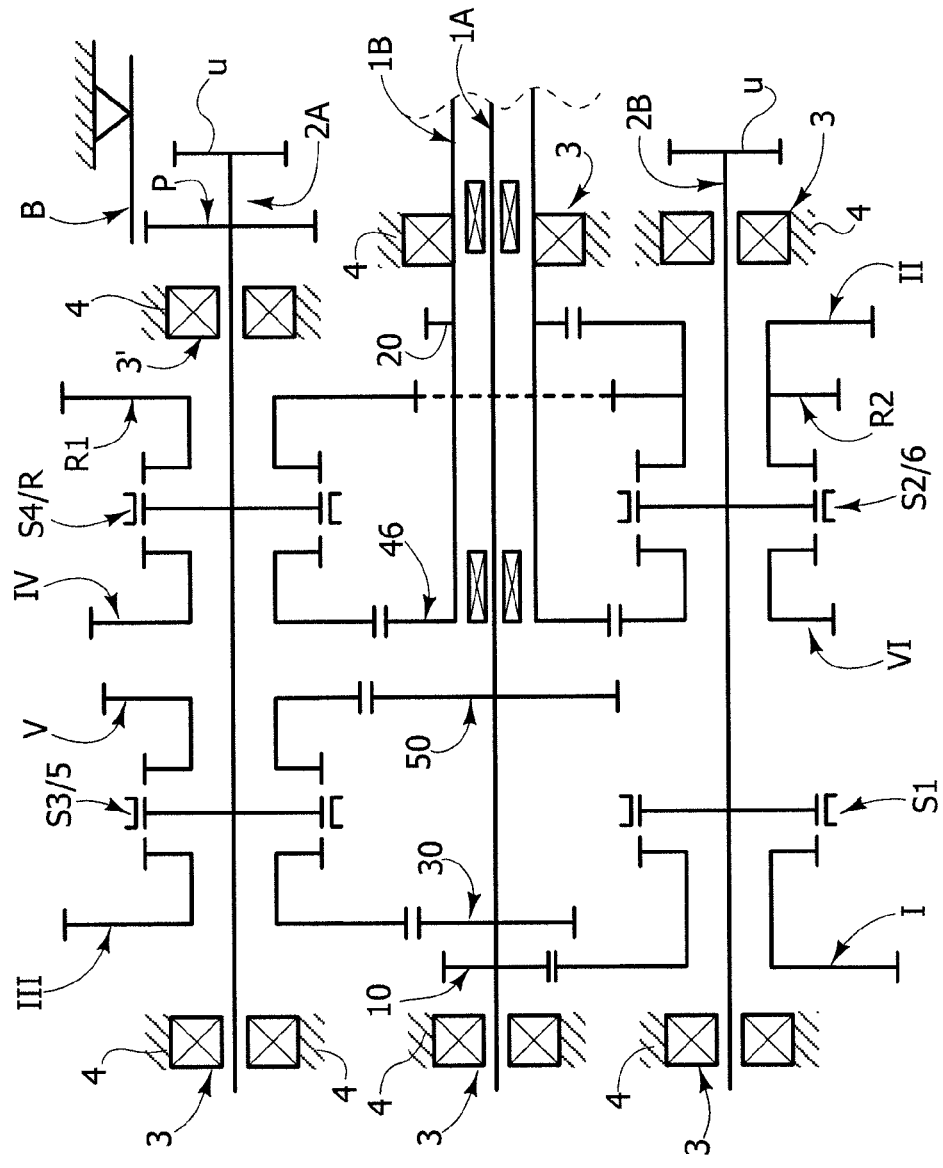
FIGS. 2, 3 are diagrams of two further embodiments of the gear change device according to the invention.

In all solutions illustrated in FIGS. 1, 2 a parking gear wheel P cooperating with a parking device B which can be of any known type (illustrated solely schematically in the drawings) for locking the gear change device in the parking condition is rigidly mounted on the first secondary shaft 2A.

According to the invention, the parking gear wheel P is mounted adjacent to a roller bearing (3') which rotatably supports said first secondary shaft (2A) within the casing 4 and which is axially interposed between said parking gear wheel (P) and said first reverse gear wheel (R1). Such characteristic is present in all solutions illustrated in FIGS. 1-4.

Due to the above indicated characteristics, the gear change device according to the invention, besides maintaining all the characteristic advantages of the abovementioned device, facilitates the designer in that it allows a wider range of choice when arranging the various elements of the gearbox, and in particular the elements associated to the lock device for the parking according to the available spaces.

Figure 3:
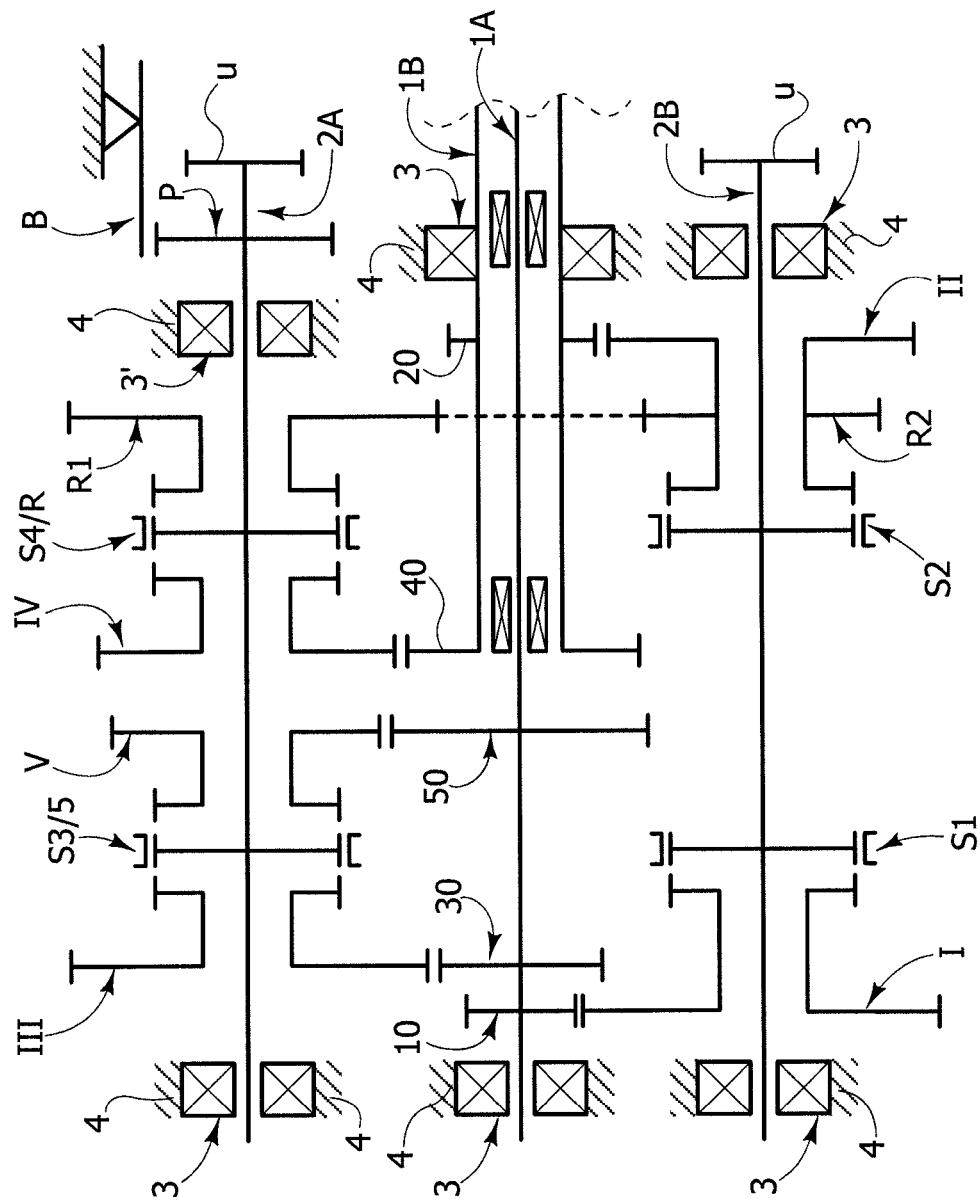

The solutions illustrated in FIGS. 2, 3 differ from that of FIG. 1 solely due to the fact that they provide for only six gears (FIG. 2) or only five gears (FIG. 3). In such figures, the common parts are indicated using the same reference numbers. The six-gear gearbox of FIG. 2 differs from the seven-gear one of FIG. 1 simply due to the elimination of the gear wheel VII of the seventh gear, hence the gear selector Si operates only in one direction, to select the first gear. The five-gear gearbox of FIG. 3 differs from the six-gear one of FIG. 2 simply due to the elimination of the gear wheel VI of the sixth gear, hence the gear selector S2 operates solely in one direction, to select the second gear.

Obviously, without prejudice to the principle of the invention, the construction details and the embodiments may widely vary with respect to what has been described and illustrated purely by way of example, without departing from the scope of protection of the present invention.

What is claimed is:

1. A gear change device for a motor vehicle, comprising:
a first and a second primary shaft coaxial with respect to each other, selectively connectable to a driving shaft of the motor vehicle by means of a double clutch engagement device,
a first and a second secondary shaft, whose axes are parallel and spaced from a common axis of said primary shafts, and having respective output gear wheels intended to mesh with a gear wheel of a differential,
a plurality of pairs of gear wheels, corresponding to a plurality of forward gear ratios and to at least one reverse gear ratio, wherein gear wheels of each pair of the plurality of pairs comprise one wheel rigidly connected in rotation with one of the primary shafts or with one of the secondary shafts while another -wheel of each pair is freely rotatable respectively on one of the secondary shafts or on one of the primary shafts,
a plurality of gear selector devices for rotatably coupling each other freely rotatable gear wheel with the shaft on which it is mounted,
wherein the reverse gear ratio is defined by:
a first reverse gear wheel mounted freely rotatable on the first secondary shaft and connectable in rotation with the first secondary shaft by means of one of said selector devices, with the aim of selecting the reverse gear,
a second reverse gear wheel, which serves as an idler gear wheel for inverting the motion, which meshes with said first reverse gear wheel and which is mounted freely rotatable on the second secondary shaft, said second reverse gear wheel being permanently connected in rotation with a forward gear wheel which is mounted freely rotatable on said second secondary shaft and meshes with a gear wheel rotatably rigidly connected on one of said primary shafts,
wherein a parking gear wheel is rigidly mounted on said first secondary shaft cooperating with a lock device for locking the gear change device in the parking condition, and
said parking gear wheel is mounted on said first secondary shaft adjacent to a roller bearing which rotatably supports said first secondary shaft within a casing of a gearbox, and said roller bearing is axially interposed between said parking gear wheel and said first reverse gear wheel;
a second roller bearing supporting said first secondary shaft within said casing, said roller bearing and said second roller bearing bounding an inner portion of said first secondary shaft therebetween, said inner portion inside said casing, said plurality of pairs of gear wheels corresponding to said plurality of forward gear ratios located on said inner portion, and said parking gear wheel located outside said inner portion;
an output pinion of said output gear wheels mounted on said first secondary shaft outside said inner portion.

* * * * *